April 15, 1969     M. PESARINI ET AL     3,438,303
SYSTEM INCLUDING A TUBULAR LAUNCHING TUBE AND A ROCKET
PROVIDED WITH AN OUTER AUXILIARY LAUNCHING CHARGE
Filed Nov. 16, 1967     Sheet 1 of 3
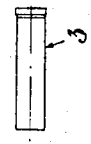
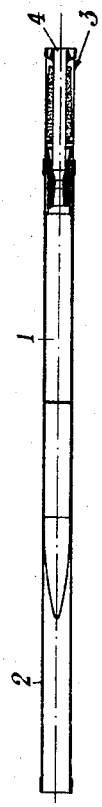
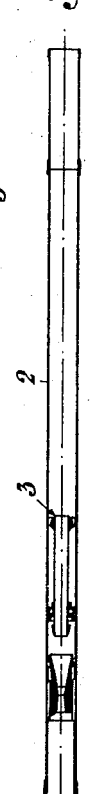
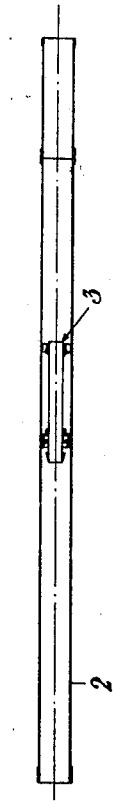
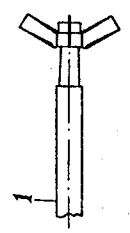
INVENTORS,
MARIO PESARINI AND
CARLO TOSTI
BY Wenderoth, Lind & Ponack
ATTORNEYS

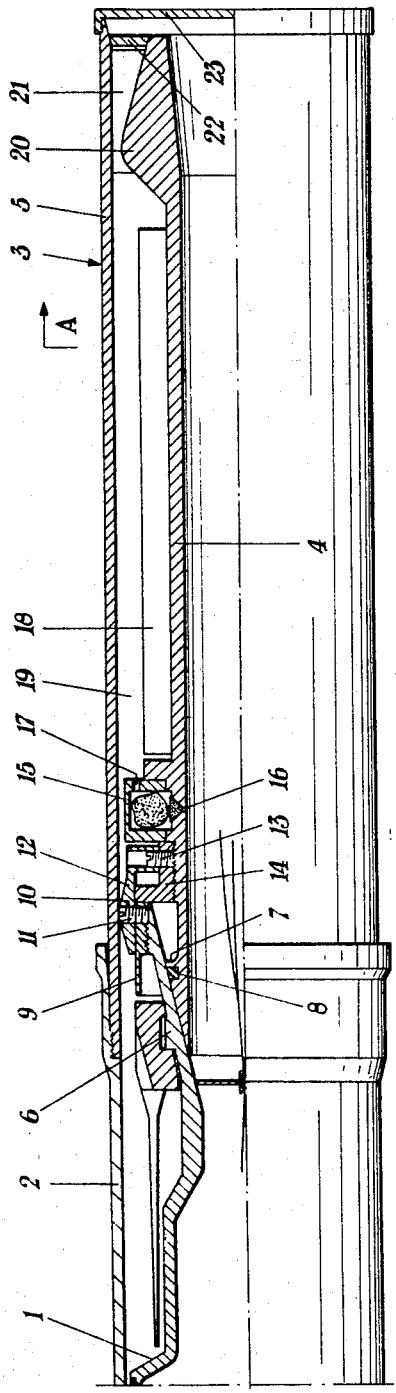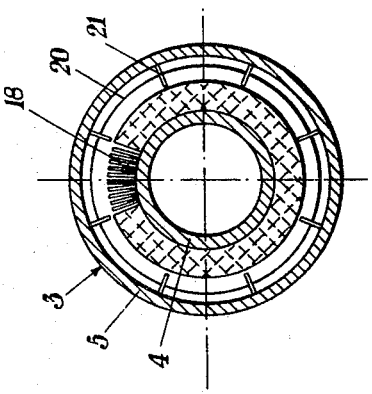

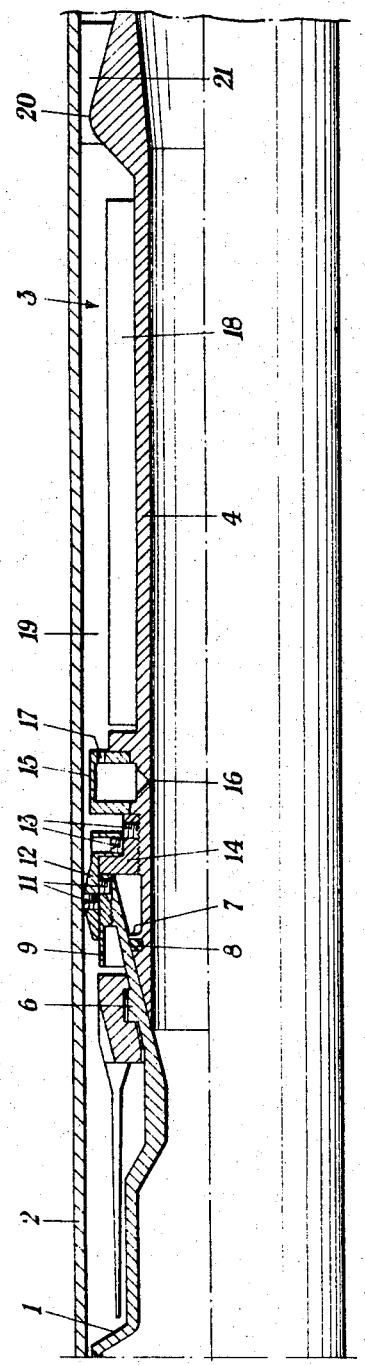
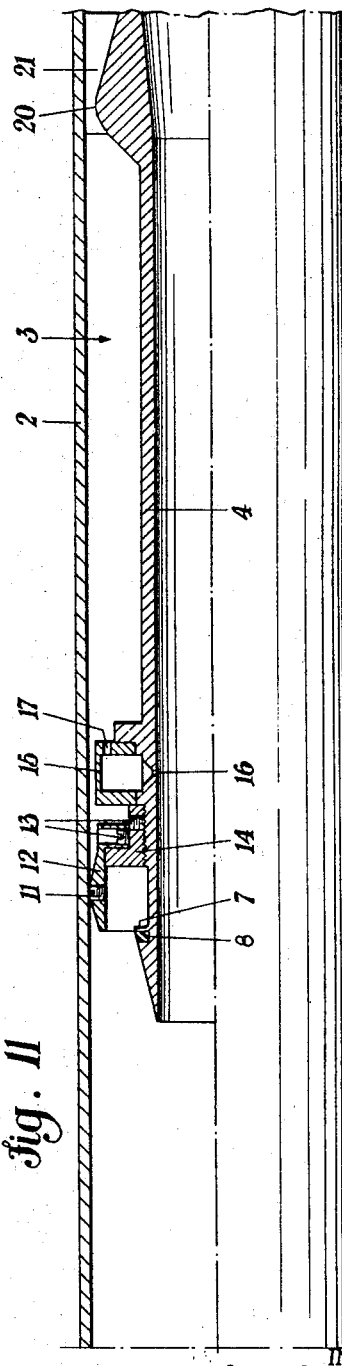

United States Patent Office 3,438,303
Patented Apr. 15, 1969

3,438,303
SYSTEM INCLUDING A TUBULAR LAUNCHING
TUBE AND A ROCKET PROVIDED WITH AN
OUTER AUXILIARY LAUNCHING CHARGE
Mario Pesarini, Velletri, and Carlo Tosti, Colleferro, Italy,
assignors to Bombrini Parodi-Delfino Società per Azioni,
Rome, Italy
Filed Nov. 16, 1967, Ser. No. 683,671
Claims priority, application Italy, Nov. 30, 1966,
43,232/66
Int. Cl. F41f 3/04
U.S. Cl. 89—1.818        3 Claims

ABSTRACT OF THE DISCLOSURE

A system including a rocket and its associated launching tube, with an annular chamber, utilized as combustion chamber of a supplementary charge, between the launching tube and a tubular member, located behind the rocket nozzle and connected thereto by a disengageable coupling system.

This invention relates to a rocket-booster system with related launching tube.

It is known that the dispersion of unguided rockets is due to many causes which provoke both systematic and random deviations from the ideal trajectory.

It is also known in theory and in practice that the deviations causing dispersion take place during the burning stage; motion is easily disturbed particularly at the outlet of the launcher and in the first section of the trajectory, when speed is still low. The rocket then undergoes deviations which for the most part, cause the final dispersion.

In order to reduce dispersion, the common practice is to impart the highest possible speed at the launcher outlet; this is achieved by reducing the burning time, thus increasing the thrust and, as a result, the acceleration.

In the limit case, when burn-out takes place while the rocket is still in the launcher, the rocket behaves like a projectile and dispersion is reduced to values of the same order of magnitude as in artillery firing.

In the typical case a rocket continuing to burn outside the launcher, conditions may be improved by imparting to the rocket a rotary motion centered on the longitudinal axis; the rotary motion can even be slow and its purpose is to compensate the effects of malalignment of thrust and of aerodynamic forces along the trajectory; it therefore contributes to reducing the dispersion even without the intervention of gyroscopic factors.

The two aforesaid features, namely high speed and rotation at the outlet of the launcher, have so far been achieved by means of special thrust programs, by using baffles or by canting the nozzles or by using a booster, which may be separated or otherwise.

There are several drawbacks attaching to each of these possible solutions, for instance, loss of thrust, insufficient rotation at the outlet of the launcher, or unnecessarily high rotation at the end of burning; it may also be necessary to secure a safety area for booster drop, or to devise means of incorporating it in the rocket which, however, implies a drop in the mass ratio, etc.

In Italian Patent No. 667,730 a rocket launching tube system is disclosed, in which an annular chamber is created between the launching tube and the rocket body, which chamber accommodates a supplementary propelling charge, acting during the motion of the rocket in the launching tube.

The object of this invention is to provide an improved rocket-booster-launching tube system, where an auxiliary propellant charge, the action of which exerts itself during the travel of the rocket in the launching tube, ensures an additional thrust during the launching stage, and whereby the aforesaid drawbacks are completely avoided. The advantages of the novel system according to the invention will be readily appreciated as the invention becomes better understood by reference to the following detailed description when considered in connection of the accompanying drawings.

The rocket-booster system with related launching tube according to the invention comprises a rocket provided with a nozzle the divergent of which is connected with a tubular member having an internal diameter greater than the diameter of the thrust area of the nozzle of the rocket motor, and an external diameter smaller than the internal diameter of the launching tube in order to leave an annular room between said tubular member and the internal wall of the launching tube, said annular room accommodating an auxiliary propellant charge supported by said tubular member, said tubular member being connected to the rocket motor by means of an annular coupling member comprising two annular rings, the first one fastened to the external periphery of the divergent of the rocket nozzle, the second one coupled by means of breakable bolts with said first annular ring and a seat provided on said tubular member; the arrangement being such that upon ignition of the auxiliary propellant through an auxiliary igniter set off by the combustion gases of the rocket motor, the thrust of the gases produced by the auxiliary propellant will force said second annular ring to cut said breakable bolts, thus disabling the mechanical coupling between said rocket and said tubular member.

The invention will now be described with reference to the attached drawings showing by way of nonlimitative example, one preferred embodiment of this invention applied to a rocket with folding fins.

In the drawings:

FIGURE 1 is an axial sectional view of the launching tube with the rocket introduced thereinto;

FIGURE 2 is a view of the booster group (tubular member with the auxiliary propellant charge) before its engagement on the rocket and the launching tube;

FIGURE 3 is a sectional view of the launching tube with the rocket and the booster before the launching;

FIGURE 4 is a sectional view of the launching tube and of the booster container with the rocket and the booster during the combustion stage;

FIGURE 5 is a sectional view of the launching tube and of the container with the rocket and the booster after the end of the booster combustion and after the disengagement thereof;

FIGURE 6 is a view of the rocket which has abandoned the launching tube;

FIGURE 7 is a sectional view of the launching tube, of the container and of the booster after the stop;

FIGURE 8 is a sectional view of the booster and of its container engaged on the rocket and on the launching tube, respectively, before the combustion;

FIGURE 9 is a sectional view taken along the line A—A of FIGURE 8;

FIGURE 10 is a sectional view of the booster and of its container during the booster combustion stage;

FIGURE 11 is a sectional view of the booster after the combusiton end.

With reference to FIGURES 1 to 7, the general arrangement of the new rocket-booster-launching tube system will be described: The arrangement comprises a rocket 1, a launching tube 2, and a booster 3, including a tubular member 4, a propellant grain and a tube portion which constitutes, after assemblage, an extension of the launching tube. When the motor of the rocket 1 is ignited, also the booster propellant will be ignited as it will be explained hereinafter, and the rocket and the booster will travel along the launching tube 2. As it will be disclosed hereinafter, the booster and the rocket are disengaged from each other at the time of ignition, and at the end of the combustion of the propellant of the booster, the latter will lag the rocket (FIG. 5), and at the end of the launch the rocket will leave the tube 2 while the booster 3 is left in the tube 2, or projected backwardly. With reference to FIGURES 8 to 11, the detailed arrangement and operation of the system will be disclosed. In FIG. 8, the rear end of the whole system before combustion is shown, partly sectioned.

Within the tubes 2 and 5, the rocket 1 is accommodated, together with the tubular member 4 of the booster. The tubular member 4 has an internal diameter greater than the thrust area of the nozzle 6 of the motor of the rocket 1, in order to allow a free passage for the combustion gases from the rocket motor. The tubular member 4 is provided with a conical shoulder 7 which rests against the internal wall of the divergent of the nozzle 6, and a gas-tight connection is obtained by means of the gasket 8. Between the contact portion of the shoulder 7 and the nozzle 6, some small longitudinal shallow channels (not shown) could be provided for rendering easier the separation of these two members when the thrust supplied by booster ceases.

On the external periphery of the divergent of the nozzle 6, an annular ring 9 is fitted, for instance screwed, said annular ring being provided with tapped holes 10 accommodating the stem of breakable bolts 11, the head of which is accommodated in holes provided in the second annular ring 12. The second annular ring 12 is also fastened by means of a second set of breakable bolts 13 screwed on the seat 14 fastened to the tubular member 4 of the booster, a clearance being provided axially between said second annular ring 12 and a shoulder provided by the seat 14. On the tubular member 4 of the booster, an ignition device 15 is provided comprising a housing connected with passages 16, 17 communicating with the path of the exhaust gases of the motor of rocket 1 and the housing of the booster propellant 18 respectively. The housing of the ignition device 15 is filled with a suitable priming material for igniting the propellant 18 as soon as the motor of the rocket 1 is started.

The annular space 19 between the internal wall of tube 5 and external wall of tube 4 forms a combustion chamber, the nozzle of which is formed by the inner wall of tube 5 itself and by the member 20 connected with tube 4. If desired, said nozzle may be provided with canted baffles 21 for impressing a spinning to the rocket-booster combination. In 22 a diaphragm for the booster ignition is shown, and in 23 a mechanical stop may be provided, for avoiding a backward motion of the rocket during the loading in the launching tube.

The operation is as follows: When the motor of the rocket is started, the hot exhaust gases will ignite the priming charge contained in housing 15 through the passages 17. With the build-up of the pressure of the combustion gases of the propellant 18, the second ring 12 will experience a forward thrust such as to cause the shearing of the coupling bolts 11, 13. The second ring 12 will then slide against the shoulder provided by the seat 14 and will remain there (see FIG. 10). As long as the thrust provided by the booster propellent 18 is greater than the thrust of the motor of the rocket 1, the conical shoulder 7 will be held against the internal wall of the nozzle 6, thus maintaining a gas-tight engagement between these two members. When the thrust of the rocket motor 1 prevails and rocket 1 accelerates over the tubular member 4 of the booster, these two members will separate each other as they are simply abutting after the breakage of the bolts 11, 13, and the tubular member 4 will be strongly braked by the exhaust gas of the rocket impinging thereon. After emerging from the launching tube, the rocket is not loaded with any excess weight and is propelled in flight by the main motor with the fins in the unfolded position.

Particularly in respect of the device disclosed in the above cited Italian Patent No. 667,730 the present invention has the advantage that the diameter of the launching tube is not necessarily dependent on the execution of the rocket-booster system: in the limit case, the tube might have the same caliber of the rocket. Furthermore, the improved system according to this invention makes it possible to avoid projections forwardly outside the launching tube.

Having thus described the invention what is claimed is:

1. A rocket-booster system comprising a launching tube, a rocket motor having a nozzle, a tubular member co-operating with said nozzle having an internal diameter greater than the diameter of the thrust area of said nozzle and an external diameter smaller than the internal diameter of said launching tube thereby forming an annular space between said tubular member and the internal wall of said launching tube, an auxiliary propellant having an auxiliary igniter supported by said tubular member in said annular space, an annular coupling member connecting said tubular member to said rocket motor comprising two annular rings, the first one of said rings being fastened to the external periphery of said nozzle, the second one of said rings being coupled by means of breakable bolts with said first annular ring and a seat provided on said tubular member so that upon ignition of said auxiliary propellant by said auxiliary igniter set off by the combustion gases of said rocket motor, the thrust of the gases produced by said auxilary propellant will force said second annular ring to break said breakable bolts, thus disabling the mechanical connection between said rocket motor and said tubular member.

2. A rocket-booster system according to claim 1, wherein said first annular ring is screwed on the external periphery of said nozzle and said second annular ring is kept in place by means of a set of breakable bolts arranged circumferentially and screwed on said first annular ring and on a seat provided on said tubular member, a clearance being provided axially between said seat and said second annular ring in order that the thrust of the booster gases will cause a sliding movement of said second annular ring with consequent shearing of the retaining bolts.

3. A rocket-booster system according to claim 1 wherein said igniter for said auxiliary propellant comprises a housing located between said annular coupling member and said auxiliary propellant on the external wall of said tubular member, said housing accommodating said auxiliary igniter comprising a priming charge communicating with the interior of said tubular member and said annular space for said auxiliary propellant, through a first and a second passage, the first passage allowing the entry of the hot exhaust gases of the rocket motor into said housing for the ignition of said priming charge, and said second passage allowing the escape of the blast of the priming charge towards the auxiliary propellant for ignition thereof.

References Cited

UNITED STATES PATENTS

| 2,871,762 | 2/1959 | Schmued | 89—1.808 |
| 3,093,964 | 6/1963 | Hausmann | 102—49.4 |
| 3,251,267 | 5/1966 | Hauser et al. | 89—1.808 |

SAMUEL W. ENGLE, *Primary Examiner.*

U.S. Cl. X.R.

89—1.808; 102—49.5